United States Patent
Kulak

(10) Patent No.: US 12,498,450 B2
(45) Date of Patent: Dec. 16, 2025

(54) DEVICE FOR RADIOLOCATION OF OBJECTS IN SPACE AND A GPR SYSTEM

(71) Applicant: WIDMO SPECTRAL TECHNOLOGIES SP. Z O.O., Cracow (PL)

(72) Inventor: Andrzej Kulak, Cracow (PL)

(73) Assignee: WIDMO SPECTRAL TECHNOLOGIES SP. Z O.O., Cracow (PL)

( * ) Notice: Subject to any disclaimer, the term of this patent is extended or adjusted under 35 U.S.C. 154(b) by 442 days.

(21) Appl. No.: 18/033,416

(22) PCT Filed: Nov. 2, 2020

(86) PCT No.: PCT/IB2020/060261
§ 371 (c)(1),
(2) Date: Apr. 24, 2023

(87) PCT Pub. No.: WO2022/090786
PCT Pub. Date: May 5, 2022

(65) Prior Publication Data
US 2023/0417868 A1    Dec. 28, 2023

(51) Int. Cl.
G01S 7/03 (2006.01)
G01S 7/35 (2006.01)
G01S 13/88 (2006.01)

(52) U.S. Cl.
CPC ........ *G01S 7/03* (2013.01); *G01S 7/35* (2013.01); *G01S 13/885* (2013.01)

(58) Field of Classification Search
CPC .......... G01S 13/32; G01S 13/885; G01S 7/03; G01S 7/35; G01V 3/12
See application file for complete search history.

(56) References Cited

U.S. PATENT DOCUMENTS 3,795,912 A * 3/1974 Pierce .................. G01S 13/32
342/194
4,075,555 A * 2/1978 Wight .................. G01R 25/02
342/22

(Continued)

FOREIGN PATENT DOCUMENTS

DE    102009045677 A1    4/2011
EP        0138253 A2    4/1985
WO       0244748 A2    6/2002

OTHER PUBLICATIONS

Olver, A.D. et al. (1988). FMCW Radar for Hidden Object Detections, Proceedings of the Institution of Electrical Engineers, Radar and Signal Processing, vol. 135, Pt. F.(4), pp. 354-361, DOI: 10.1049/ip-f-1.1988.0042, 8pp.

(Continued)

*Primary Examiner* — Peter M Bythrow
(74) *Attorney, Agent, or Firm* — The Roy Gross Law Firm, LLC; Roy D. Gross

(57) ABSTRACT

A device for radiolocation of objects in space (100), comprising: a frequency-modulated continuous-wave FMCW generator (101), a transmitting-receiving antenna (102) connected to the generator (101), a non-linear quadripole (103A) squaring the input signal, connected at its input to the generator (101) and to the antenna (102), and at its output to a filter (104A, 104B).

A ground penetrating radar system (200) adapted to detect wave-reflecting objects (301) located in the vicinity of a wave-propagating medium (300), comprising: the device for radiolocation of objects in space (100), an echo signal amplifier (201), an analogue-to-digital echo signal converter (202) and a processing and visualisation circuit (203).

14 Claims, 4 Drawing Sheets

(56) References Cited

U.S. PATENT DOCUMENTS

| | | | | |
|---|---|---|---|---|
| 6,587,257 | B1* | 7/2003 | Davies | H04B 10/2575 |
| | | | | 359/328 |
| 6,791,489 | B1* | 9/2004 | Richardson | G01S 13/765 |
| | | | | 342/51 |
| 7,136,425 | B2* | 11/2006 | Nation | H04L 27/366 |
| | | | | 375/295 |
| 10,670,700 | B2 | 6/2020 | Mcmahon et al. | |
| 2005/0179586 | A1* | 8/2005 | Klinnert | G01S 13/003 |
| | | | | 342/115 |
| 2013/0063299 | A1* | 3/2013 | Proudkii | G01S 7/024 |
| | | | | 342/188 |
| 2015/0084808 | A1* | 3/2015 | Vacanti | G01S 13/343 |
| | | | | 342/128 |
| 2020/0136263 | A1* | 4/2020 | Lee | G01S 13/755 |
| 2020/0150260 | A1* | 5/2020 | Lang | G01S 13/42 |
| 2021/0055411 | A1* | 2/2021 | Lee | G01S 13/89 |

OTHER PUBLICATIONS

PCT International Search Report for International Application No. PCT/IB2020/060261, mailed Jul. 13, 2021, 4pp.

PCT Written Opinion for International Application No. PCT/IB2020/060261, mailed Jul. 13, 2021, 11pp.

* cited by examiner

DEVICE FOR RADIOLOCATION OF OBJECTS IN SPACE AND A GPR SYSTEM

CROSS REFERENCE TO RELATED APPLICATIONS

This application is a National Phase of PCT Patent Application No. PCT/IB2020/060261 having International filing date of Nov. 2, 2020, the contents of which are all incorporated herein by reference in their entirety.

TECHNICAL FIELD

The object of the invention is a device for radiolocation of objects in space and a ground penetrating radar (GPR) system.

PRIOR ART

Devices for radiolocation of objects in space, adapted to be used in GPRs or to operate as motion sensors using pulse techniques are known from the prior art. The principle of operation of these devices consists in emitting short, strong electromagnetic pulses towards a potential object reflecting the waves, and then in receiving the reflections of these pulses from the object reflecting the waves. The delays of received signals are converted into the distance of objects, and their intensity determines the physical properties of these objects. In order to achieve a satisfactory measurement accuracy in GPR applications, the pulses generated by the radiolocation device must be very short, which means that while maintaining the required range, their power must be very high. In practice, these are pulse powers of the order of several dozen kilowatts, with a relatively shallow GPR measurement. Devices for radiolocation of objects using pulse techniques have limited efficiency in the field of spectral measurements. Their operation is carried out at a specific frequency, and conducting measurements in a wide frequency range requires multiple antenna changes and repeated measurements.

From the US patent application US2020150260A1 a method of detecting radar targets is known which comprises the provision of a digital radar signal containing a sequence of signal segments. Each signal segment in the sequence is suitably associated with the chirping of the transmitted radar signal. The method further comprises detecting one or more radar targets based on a first sub-sequence of successive signal segments of the sequence. For each detected radar target, a distance value and a speed value are determined. If a group of radar targets having overlapping signal components is detected, a corresponding spectral value is computed for each radar target from the group of radar targets based on the second sub-sequence of the signal segment sequence and then based on the speed value set for the group of radar targets.

Devices for radiolocation of objects in space, adapted to be used in radars, including GPRs, or to operate as motion sensors using Frequency-Modulated Continuous-Wave FMCW. These devices usually use homodyne receivers.

A radar sensor is known from the German patent application DE102009045677A1 which has an evaluation stage for recording a time signal, which indicates the time response of the amplitude of the intermediate frequency signal during the time of the frequency rise. The degree of transformation of the sensor converts the time-domain signal into a frequency spectrum, and its storage device stores an output power that indicates the relationship between frequencies of the transmitting signal and the receiving signal. The sensor comprises a filter and a window function generator which compensate for the output power in the time-domain signal. A special feature of this solution is the power equalisation in order to obtain an amplitude-normalised homodyne signal.

Radar motion detectors are known from the US patent U.S. Ser. No. 10/670,700B2, which are adapted to operate in a shared neighbourhood in order to reduce interference. Interference is reduced by time and/or frequency synchronisation. A main radar motion sensor transmits the first radar signal having a first frequency. A secondary radar motion detector determines a second radar signal having a second frequency which minimises interference with the first frequency. Interference is also reduced by additional transmission adjustments, such as pulse width reduction or differences in frequency and/or in timing. The device comprising the radar motion sensors may be configured with a plurality of sensors and adapted to emit radar signals in different directions to mitigate interference between the signals emitted from the motion sensors.

In the solutions known from the prior art, the existence of the so-called dead zone is problematic. This zone includes a distance from the device for radiolocation of objects to the wave-reflecting object within which detection is incorrect or not possible at all. A large dead zone is a special feature of devices for radiolocation of objects made according to pulse technique. These devices, due to high powers of short pulses, are also characterised by high electromagnetic emissions, which adversely affects other radio devices in their vicinity and may interfere with their operation.

In the solutions known from the prior art, especially those built with the use of homodyne circuits, masking the signal reflected by the phase noise of the generator used is problematic. This phenomenon is particularly visible when detecting objects reflecting waves, located in close proximity to the antenna of the device for detecting objects in space. This phenomenon negatively affects the quality and correctness of detection.

Therefore, it is expedient to provide a device for radiolocation of objects in space, adapted to be used in a GPR system or as motion sensors which would be free from the above-mentioned drawbacks.

SUMMARY OF THE INVENTION

The present invention relates to a device for radiolocation of objects in space, comprising a frequency-modulated continuous-wave FMCW generator, a transmitting-receiving antenna connected to the generator, a non-linear quadripole squaring the input signal, connected at its input to the generator and to the antenna, and at its output to the filter.

Preferably, the device comprises a delay line through which the antenna is connected to the generator.

Preferably, the delay line is in the form of a wave-conformed transmission line or an LC delay circuit or a delay circuit based on surface acoustic waves (SAW).

Preferably, the filter is a low pass filter or a band pass filter.

Preferably, the non-linear quadripole is based on a FET or a diode circular mixer.

The invention also relates to a device for radiolocation of objects in space, comprising a frequency-modulated continuous-wave FMCW generator, a transmitting-receiving antenna connected to the generator, a mixer connected at its first input to the generator and to the antenna, at its second input to the generator and at its output to the filter.

Preferably, the mixer is connected at its second input to the generator via an additional delay line.

Preferably, the mixer is connected at its first input to the antenna via a delay line.

Preferably, the additional delay line is in the form of a wave-conformed transmission line or an LC delay circuit or a delay circuit on surface acoustic waves SAW.

Preferably, the delay line is in the form of a wave-conformed transmission line or an LC delay circuit or a delay circuit based on surface acoustic waves SAW.

Preferably, the filter is a low pass filter or a band pass filter.

The invention further includes a ground positioning radar (GPR) system adapted to detect wave-reflecting objects placed in the vicinity of a wave-propagating medium, comprising a device for radiolocation of objects in space, an echo signal amplifier, an analogue-to-digital echo signal converter, and a processing and visualisation circuit.

Preferably, the system is adapted to detect wave-reflecting objects in a wave-propagating medium which is the ground.

Preferably, the system is adapted to detect metal and/or dielectric, and/or ferromagnetic objects.

The device according to the invention, thanks to its design, is characterised by the lack of a dead zone, unlike the pulse radars known from the prior art. It has a very low electromagnetic emission (10 mW to 1 W).

Thanks to the use of the delay line, the device according to the invention is characterised by a large reduction in the influence of the phase noise of the generator (20 to 40 dB), which translates into obtaining large penetration ranges despite the simplicity of the detector system (1 m to 15 m in the sandy ground).

The device according to the invention is characterised by great simplicity of design due to the use of a single antenna and simple electronic circuits.

The advantage of the device with its high design simplicity is the ease of use of a wide FM tuning band of over 100%, and thus good resolution (10 cm to 5 cm) and high accuracy for measuring the distance of reflecting objects located close to the antenna.

In a typical embodiment, the device according to the invention is characterised by a tuning range of the FMCW generator of 300 to 1600 MHz.

The GPR system according to the invention has a low weight (2 kg to 25 kg depending on the type of antenna and housing) and a low power consumption (10 to 30 W mainly depending on digital data-processing circuits).

DESCRIPTION OF THE DRAWING

The subject of the invention is shown in the embodiments in a drawing, in which.

EMBODIMENTS OF THE INVENTION

Embodiment 1

Figure 1:
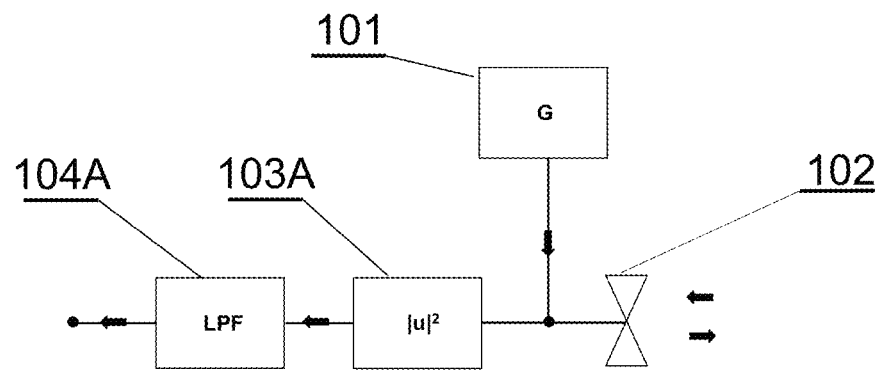
FIG. 1 shows a device for radiolocation of objects in space according to a first embodiment which uses a non-linear quadripole.

FIG. 1 shows a device for radiolocation of objects in space 100 which uses a non-linear quadripole 103A. The device comprises a frequency-modulated continuous-wave FMCW generator 101. A transmitting/receiving antenna 102 is connected to the generator 101. The non-linear quadripole 103A, squaring the input signal, is connected at its input to the generator 101 and to the antenna 102, and at its output to a low pass filter 104A. The node to which the output of the generator 101, the input of the antenna 102, and the input of the non-linear quadripole 103A are connected is a common node.

The non-linear quadripole 103A is used to obtain a signal with a differential frequency. At the input of the quadripole 103A, the signal from the generator 101 and the signal returned from the antenna 102 are simultaneously applied. As a result of squaring the sum of the signals, a series of signals is produced, among which signals, there is a signal with a differential frequency constituting a difference between the frequency of the generator and the frequency of the signal returned from the antenna. It is a signal with an intermediate frequency. A low pass filter 104A is used to isolate this signal. The signal at the output of the low pass filter 104A is the specific signal of the FMCW radar echo, which signal may be further processed by a radar system, including GPR system 200, or used for motion detection.

The non-linear quadripole 103A may be implemented with a FET where the gate of the transistor is connected to the common node. The FET has a parabolic transition characteristic defined as the relationship between the gate voltage and the drain current. The non-linear quadripole 103A may also be implemented with a diode circular mixer operating in a squaring circuit. In this application, the generator 101 (heterodyne) input and the signal input are connected to each other.

Embodiment 2

Figure 2:
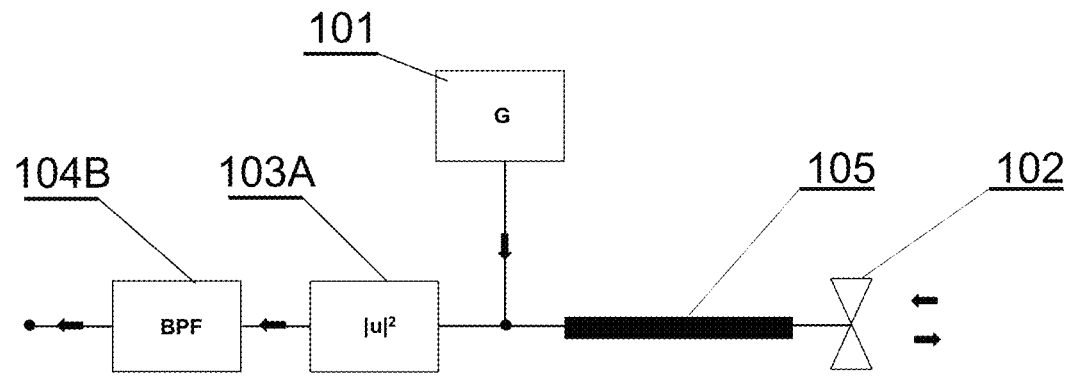
FIG. 2 shows a device for radiolocation of objects in space according to a second embodiment which uses a non-linear quadripole and a single delay line.

FIG. 2 shows a device for radiolocation of objects in space 100, including elements as in Embodiment 1. This device differs from the device shown in Embodiment 1 in that a band pass filter 104B is used in place of the low pass filter 104A. In addition, the device 100 comprises a delay line 105 through which the antenna 102 is connected to the generator 101.

Thanks to the use of the delay line 105, the effect of the phase noise of the generator on the operation of the device 100 is significantly reduced. Thanks to the reduction of the phase noise of the generator, a significant improvement in the signal-to-noise ratio SNR of the output signal of the FMCW radar echo of the device 100 is achieved in case of measurements over short distances. The generator 101 is a high-frequency generator which is characterised by phase noise, the power of which decreases as it moves away from the carrier frequency of the generator. In the device according to Embodiment 1, the signal coming directly from the generator is multiplied with the signal returning from the antenna, the latter signal having passed a certain path—to the obstacle and back. If the obstacle from which the signal reflected is close to the antenna, it returns with a small delay and by multiplication with the original (squaring in the non-linear quadripole 103A) it reveals strong phase noise of the generator which masks the reflected signal. Addition of an additional delay in the form of a delay line in the present embodiment reduces the phase noise and improves the signal-to-noise SNR of the output signal of FMCW radar echo.

The delay line 105 may be implemented as a symmetrical or unsymmetrical transmission line, wave-conformed to the output of the generator 101 and the antenna 102. The delay line 105 may take the form of an LC delay circuit on passive elements, analogous to those used in analogue oscilloscopes. The delay line 105 may also take the form of a delay circuit based on surface acoustic waves SAW.

Embodiment 3

Figure 3:
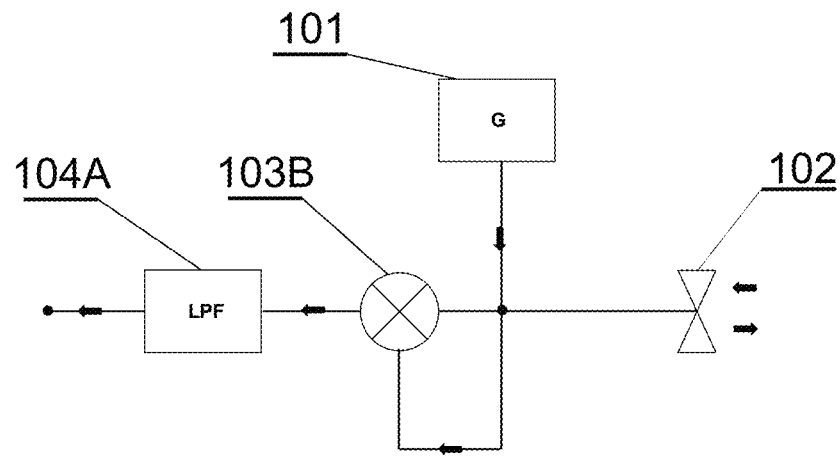
FIG. 3 shows a device for radiolocation of objects in space according to a third embodiment which uses a mixer.

FIG. 3 shows a device for radiolocation of objects in space 100, comprising a frequency-modulated continuous-wave FMCW generator 101 and a transmitting-receiving antenna 102 connected to the generator 101. The device 100 comprises a mixer 103B connected at its first input to the generator 101 and to the antenna 102 and at its second input to the generator 101. At the output of the mixer 103B, a signal is obtained with a differential frequency being the difference between the generator frequency and the frequency of the signal returned from the antenna. It is a signal with an intermediate frequency. A low pass filter 104A is used to isolate this signal. The signal at the output of the low pass filter 104A is the specific signal of the FMCW radar echo, which signal may be further processed by a radar system, including GPR system 200, or used for motion detection.

Embodiment 4

Figure 4:
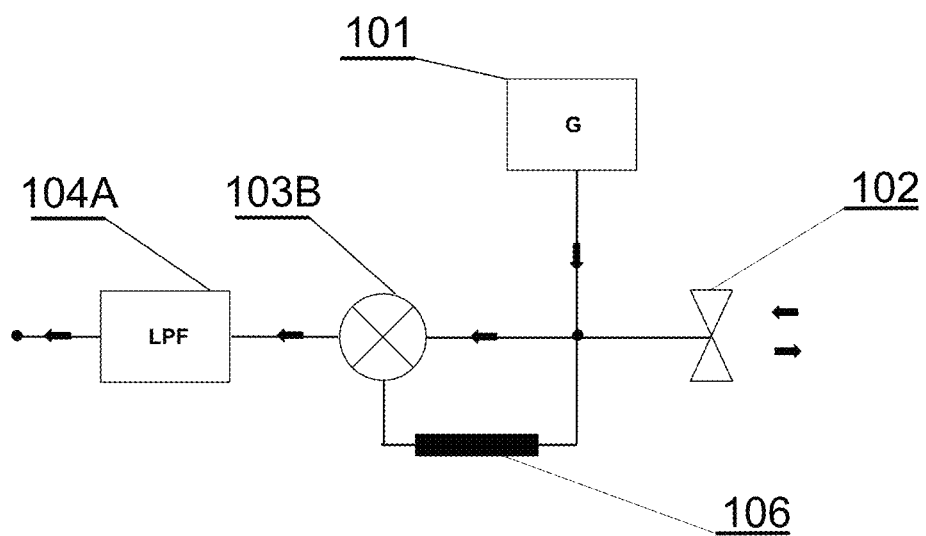
FIG. 4 shows a device for radiolocation of objects in space according to a fourth embodiment which uses a mixer and a single delay line.

FIG. 4 shows a device for radiolocation of objects in space 100, including elements as in Embodiment 3. This device differs from the device shown in Embodiment 3 in that the mixer 103B is connected therein at its second input to the generator 101 via an additional delay line 106. The additional delay line has analogous characteristics to the delay line 105 used in Embodiment 2.

Embodiment 5

Figure 5:
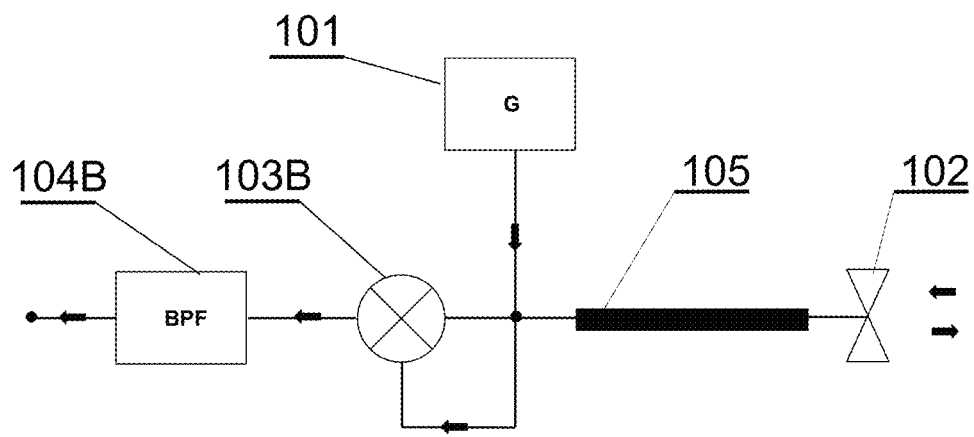
FIG. 5 shows a device for radiolocation of objects in space according to a fifth embodiment which uses a mixer and a single delay line.

FIG. 5 shows a device for radiolocation of objects in space 100, including elements as in Embodiment 3. This device differs from the device shown in Embodiment 3 in that the mixer 103B is connected at its first input to the antenna 102 via the delay line 105. The delay line 105 has analogous characteristics to the delay line 105 used in Embodiment 2. In addition, in the present embodiment, a band pass filter 104b is provided in place of the low pass filter 104A.

Embodiment 6

Figure 6:
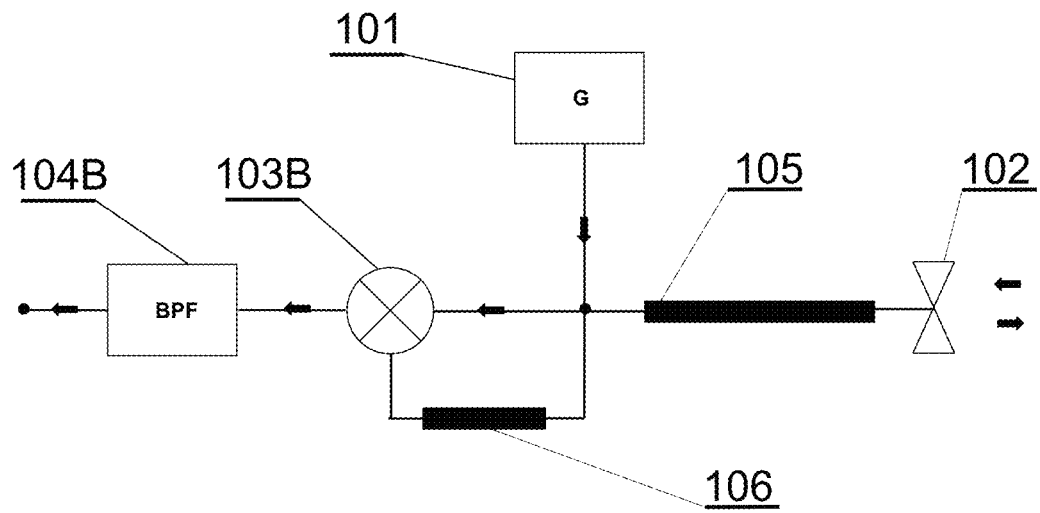
FIG. 6 shows a device for radiolocation of objects in space according to a sixth embodiment which uses a mixer and two delay lines.

FIG. 6 shows a device for radiolocation of objects in space 100, including elements as in Embodiment 5. This device differs from the device shown in Embodiment 5 in that the mixer 103B is connected therein at its second input to the generator 101 via the additional delay line 106. The additional delay line 106 has analogous characteristics to the delay line 105 used in Embodiment 2. Thanks to the use of the additional delay line, the signal-to-noise ratio SNR of the output signal of FMCW radar echo is further improved.

Embodiment 7

Figure 7:
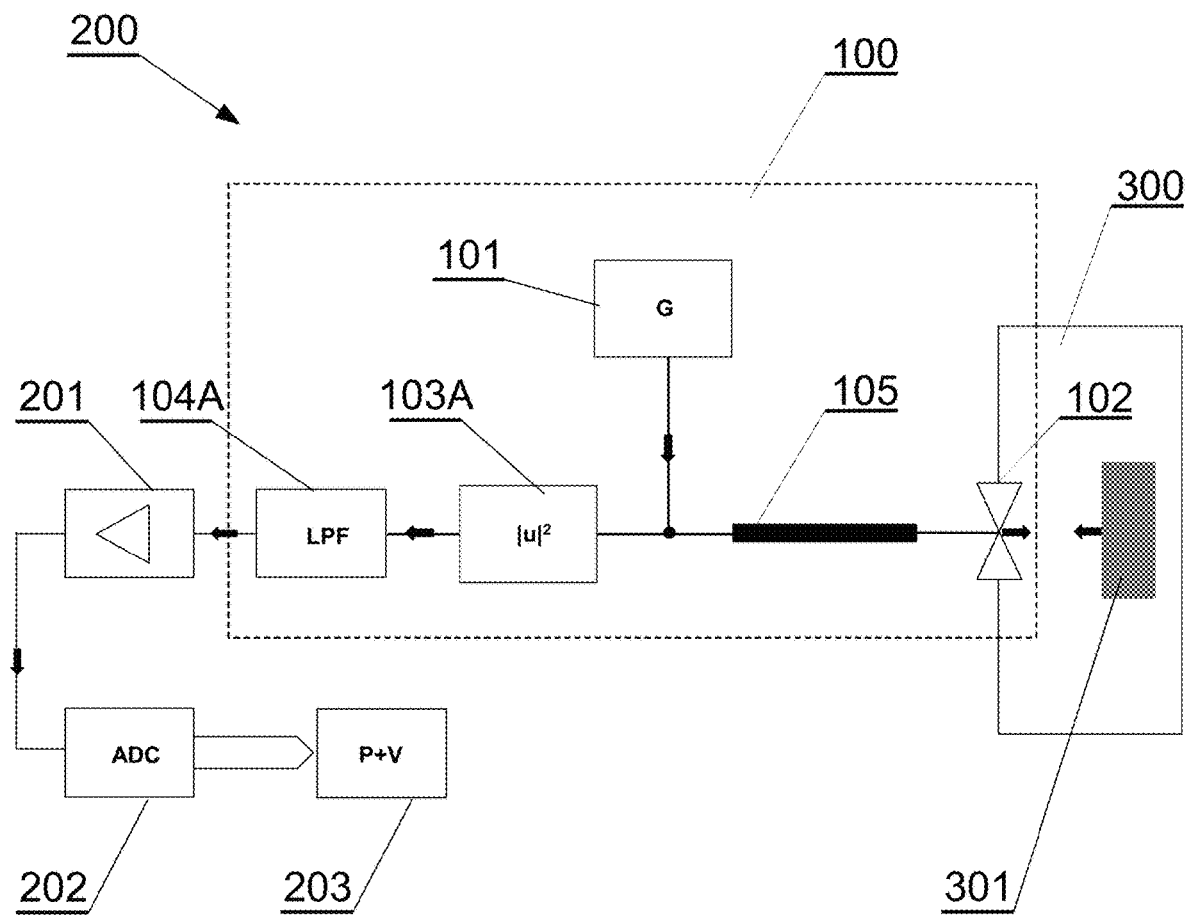
FIG. 7 shows a GPR system according to a seventh embodiment.

FIG. 7 shows a GPR system 200 adapted to detect wave-reflecting objects 301 located in the vicinity of the wave-propagating medium 300 constituting the ground. The system comprises the device for radiolocation of objects in space 100 according to Embodiment 1, wherein the device 100 additionally comprises the delay line 105 through which the antenna 102 is connected to the generator 101. The system further comprises an echo signal amplifier 201 connected at the output of the device for radiolocation of objects in space 100. The amplifier 201 is connected at the output to the input of the analogue-to-digital echo signal converter 202, which converter provides the sampled signal to the processing and visualisation circuit 203.

The generator 101 produces a linearly modulated FM signal which is routed via the delay line 105 to the antenna 102 and to the input of the non-linear quadripole 103A. The antenna 102 radiates a wave which travels through a wave-propagating medium in the ground 300, e.g. in sand. Having reached the wave-reflecting object 301, the wave is reflected and returns to the antenna 102. The antenna converts the electromagnetic field of the returning wave to a voltage signal which, via the delay line 105, reaches the input of the non-linear quadripole 103A. The returning signal is delayed in relation to the generator signal by twice the propagation time in the delay line plus twice the propagation time on the path from the antenna 102 to the wave-reflecting object 301. This signal at the input of the quadripole is added to the signal produced by the generator 101. A 2nd order non-linear quadripole squares the sum of both signals. The output product includes an echo signal with a differential frequency, a generator signal and a returning signal. Thanks to the use of FMCW modulation, the differential frequency is proportional to the sum of delays in the delay line 105 and in the waves-propagating medium 300. Based on the measurement of differential frequency, the wave delay component for the medium is calculated. Then, based on the known speed of the wave in the medium, the distance of the wave-reflecting object 300 from the antenna 102 is determined. A low pass filter 104A is used to isolate the echo differential signal. The echo signal is then amplified by the echo signal amplifier 201 and converted into a digital signal by an analogue-to-digital echo signal converter 202. In the processing and visualisation circuit, the digital signal from the analogue-to-digital echo signal converter 201 is subjected to Fourier transformation FFT, thanks to which the differential frequency of the echo is read. After conversion of individual differential frequencies of the echo into the distance of the wave-reflecting object 300 from the antenna 102, their further processing and visualisation in the processing and visualisation circuit is possible.

The described structure of the GPR 200 is suitable for detecting objects 301 with electrical parameters, i.e. such as conductivity, electric permeability, magnetic permeability, other than those of the wave-propagating medium 300. Especially such as metal and/or dielectric, and/or ferromagnetic objects.

Technical parameters of the GPR system 200 are presented below:
Modulation type: FM linear triangular
Generator power: 100 mW
FM retuning range: 300 MHz to 1600 MHz
Retuning range in percent: 137%

FM retuning speed: 100 us
Differential frequency range of echoes: 0 to 5 MHz
Resolving power in depth: 5 cm
Detection range of a metal object with an area of 1m^2 in dry sand is 20 m.

Other Characteristics of the Device for Radiolocation of Objects and the GPR System In the device for radiolocation of objects 100, the low pass filter 104A and the band pass filter 104B may be used interchangeably depending on the value of the differential frequency, and the embodiments 1 to 6 are not intended to limit the use of these filters.

The GPR system 200 may be designed in a configuration with any device for radiolocation of objects 100 according to Embodiments 1 to 6, either in configuration with the low pass filter 104A or the band pass filter 104B.

LIST OF REFERENCES

100—Device for radiolocation of objects in space
101—Frequency-modulated continuous-wave, FMCW, generator
102—Transmitting-receiving antenna
103A—Non-linear quadripole
103B—Multiplier
104A—Low pass filter
104B—Band pass filter
105—Delay line
106—Additional delay line
200—GPR system
201—Echo signal amplifier (intermediate frequency)
202—Analogue-to-digital echo signal converter
203—Processing and visualisation circuit
300—Wave-propagating medium in the ground, e.g. sand
301—Wave-reflecting object (metal, dielectric or ferromagnetic object)

The invention claimed is:

1. A device for radiolocation of objects in space (100), comprising:
   a frequency-modulated continuous-wave FMCW generator (101),
   a transmitting-receiving antenna (102) connected to the generator (101),
   a non-linear quadripole (103A), squaring the input signal, connected at its input to the generator (101) and to the antenna (102), and at its output to
   a filter (104A, 104B).

2. The device according to claim 1, comprising a delay line (105) through which the antenna (102) is connected to the generator (101).

3. The device according to claim 1, wherein the delay line (105) is in the form of a wave-conformed transmission line or an LC delay circuit, or a delay circuit based on surface acoustic waves (SAW).

4. The device according to claim 1, wherein the filter is a low pass filter (104A) or a band pass filter (104B).

5. The device according to any of claim 1, wherein the non-linear quadripole (103A) is based on a FET or a diode circular mixer.

6. A device for radiolocation of objects in space (100), comprising:
   a frequency-modulated continuous-wave FMCW generator (101),
   a transmitting-receiving antenna (102) connected to the generator (101),
   a mixer (103B) connected
      at its first input to the generator (101) and to the antenna (102),
      at its second input to the generator (101),
      at its output to
   a filter (104A, 104B).

7. The device according to claim 6, wherein the mixer (103B) is connected at its second input to the generator (101) via an additional delay line (106).

8. The device according to claim 6, wherein the mixer (103B) is connected at its first input to the antenna (102) via the delay line (105).

9. The device according to claim 7, wherein the additional delay line (106) is in the form of a wave-conformed transmission line or an LC delay circuit, or a delay circuit based on surface acoustic waves (SAW).

10. The device according to claim 8, wherein the delay line (105) is in the form of a wave-conformed transmission line or an LC delay circuit, or a delay circuit based on surface acoustic waves (SAW).

11. The device according to claim 6, wherein the filter is a low pass filter (104A) or a band pass filter (104B).

12. A ground penetrating radar system (200) adapted to detect wave-reflecting
   objects (301) located in the vicinity of the wave-propagating medium (300), comprising:
      the device for radiolocation of objects in space (100) according to claim 1,
      an echo signal amplifier (201),
      an analogue-to-digital echo signal converter (202),
      a processing and visualisation circuit (203).

13. The system according to claim 12, adapted to detect wave-reflecting objects
   (301) in a wave-propagating medium (300) which is the ground.

14. The system according to claim 12, adapted to detect metal and/or dielectric, and/or ferromagnetic objects (301).

* * * * *